United States Patent

Dehn et al.

[11] Patent Number: 5,833,725
[45] Date of Patent: Nov. 10, 1998

[54] APPARATUS FOR THE CLEANING OF DUST LADEN GAS

[75] Inventors: Güther Dehn, Wesel; Horst Möllenhoff, Mülheim; Rüdiger Wegelin, Dortmund; Joachim Krein, Aach, all of Germany

[73] Assignee: LLB Lurgi Lentjes Babcock Energietechnik GmbH, Düsseldorf, Germany

[21] Appl. No.: 687,181

[22] Filed: Jul. 25, 1996

[30] Foreign Application Priority Data

Jul. 26, 1996 [DE] Germany .................. 195 27 237.4

[51] Int. Cl.$^6$ .................................................. B01D 41/00
[52] U.S. Cl. ..................... 55/302; 55/523; 55/341.1; 55/484; 55/321
[58] Field of Search .................... 55/302, 523, 341.1, 55/508, 350.1, 484, 482, 321; 95/279, 280; 210/323.2, 333.01

[56] References Cited

U.S. PATENT DOCUMENTS

| | | |
|---|---|---|
| 4,531,957 | 7/1985 | Malik ........................................ 55/360 |
| 4,904,287 | 2/1990 | Lippert et al. ............................. 55/302 |
| 5,143,530 | 9/1992 | Haldipur et al. ....................... 55/341.1 |
| 5,256,175 | 10/1993 | Zievers et al. ............................ 55/302 |
| 5,284,498 | 2/1994 | Davis et al. .............................. 55/302 |
| 5,348,571 | 9/1994 | Weber ...................................... 55/523 |
| 5,518,513 | 5/1996 | Iwanaga et al. .......................... 55/302 |

Primary Examiner—Jay H. Woo
Assistant Examiner—Robert Hopkins
Attorney, Agent, or Firm—Max Fogiel

[57] ABSTRACT

In a filter housing (10) for the cleaning of dust laden, preferably hot gas ceramic filter candles (6) which are closed at one end are positioned in multiple levels one above the other and connected to laterally spaced apart supporting collectors (7). The supporting collectors (7) and the filter candles (6) within one level form a filter module which is divided into several mutually separate filter segments (18) in the shape of a circular sector. The supporting collectors (7) of one filter segment (18) are connected with a clean gas collecting channel (8) located on the same level, whereby a space remains in the center of each level which is free of collecting supports (7). Into each clean gas collecting channel (8) protrudes a cleaning lance (19) either directly or indirectly. (FIG. 1)

18 Claims, 7 Drawing Sheets

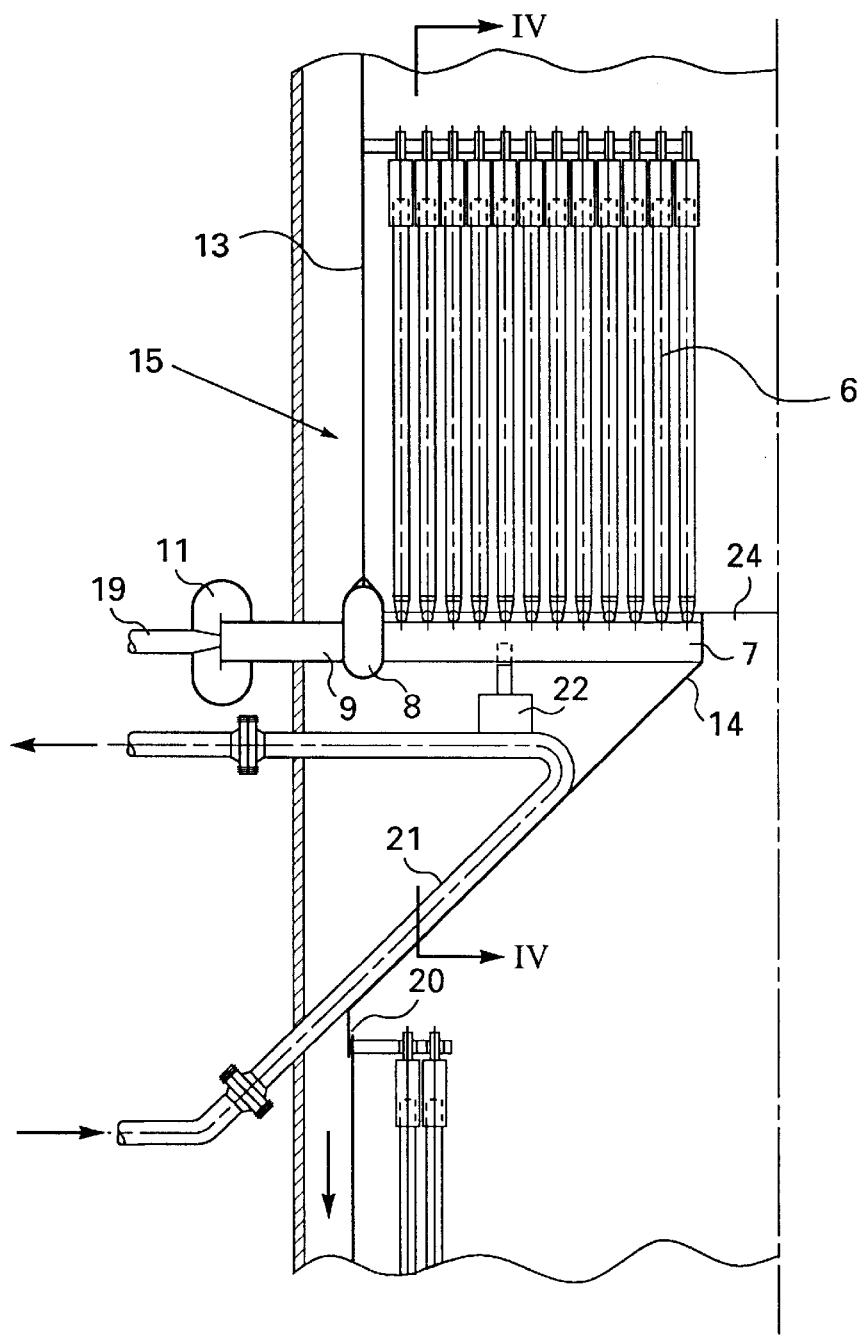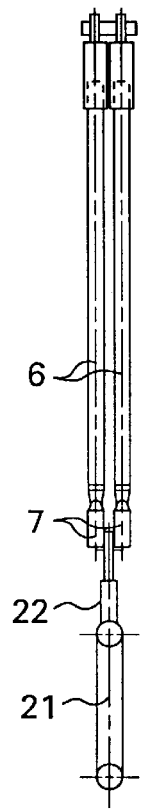
Fig. 3
Fig. 4

APPARATUS FOR THE CLEANING OF DUST LADEN GAS

BACKGROUND OF THE INVENTION

The invention relates to an apparatus for the cleaning of dust laden, preferably hot gas by way of ceramic filter candles which are closed at one end.

A hot gas filter with ceramic filter candles is known from EP-PS 0 433 637, which stand on collector channels or are suspended therefrom. These collector channels are stacked spaced apart parallel in multiple layers within the filter housing. The collector channels open into a clean gas collector chamber which is formed in the filter housing and to which an exit flange is connected. The filter candles are periodically cleaned by way of pulsed gas. The dust which is thereby detached from the filter candles can admix with the raw gas proceeding to the filter candles in the lower levels and will once again deposit on the these filter candles. This redepositing of the dust and the thereby necessary double or triple removal of the same dust significantly increases consumption of the pulsed gas which must be clean, possibly especially processed, but always compressed to high pressures.

In the hot gas filter known from EP-PS 0 129 053 the filter candles are suspended from multiple, stacked perforated plates which are respectively proceeded by a conical hood for the removal of the clean gas. The dust detached from the filter candles is intended to slide along the slope of the hood respectively below. However, in this arrangement the detached dust is also carried along by the raw gas because of turbulence below the perforated plates and can deposite once again on the filter candles of the lower levels.

All perforated floors of the hot gas filter known from EP-PS 0 129 053 are connected with a central guide conduit for the removal of the clean gas, which conduit is supported on the filter housing. Since the guide conduit cannot be loaded arbitrarily high, the number of perforated floors and filter candles in a filter housing is limited.

SUMMARY OF THE INVENTION

It is an object of the invention to modify the conventional apparatus so that the filter candles can be groupwise cleaned and that the consumption of pulsed gas for the cleaning can be reduced.

Dividing the filter apparatus into mutually independent filter modules and dividing the filter modules into with respect to the gas mutually separate filter segments provides the possibility to select the cleaning sequence such that the filter candles which are positioned above one another are not simultaneously cleaned. The pulsed backflowing of the cleaning gas is diverted to both sides by the symmetrical arrangement of the supporting collectors so that expensive diverging arrangements are avoided.

Symmetrical flow characteristics of the raw gas stream are achieved, since the raw gas stream comes centrally from above and the clean gas is immediately removed at each level of a filter module. This leads to a relatively even loading of all filter candles with dust and thereby to a further reduction in the pulse gas required for cleaning.

The separation of the filter apparatus into mutually independent filter modules and their separation into filter segments allows that each filter segment can be individually supported on the wall of the filter housing. The filter apparatus for weight reasons can thereby be equipped with a large number of filter modules which are positioned one above the other. For example six or more filter modules positioned above one another are possible, whereby the filter housing can be made comparatively slim for a given filter surface to be included. The free space which remains in the center of the supporting collectors and the filter candles serves to compensate the thermal expansion of the filter segments. In addition, the free space can be used as installation opening.

BRIEF DESCRIPTION OF THE DRAWINGS

Several exemplary embodiments of the invention are illustated in the drawing and will be described in the following.

It shows.

DESCRIPTION OF THE PREFERRED EMBODIMENTS

Figure 1:
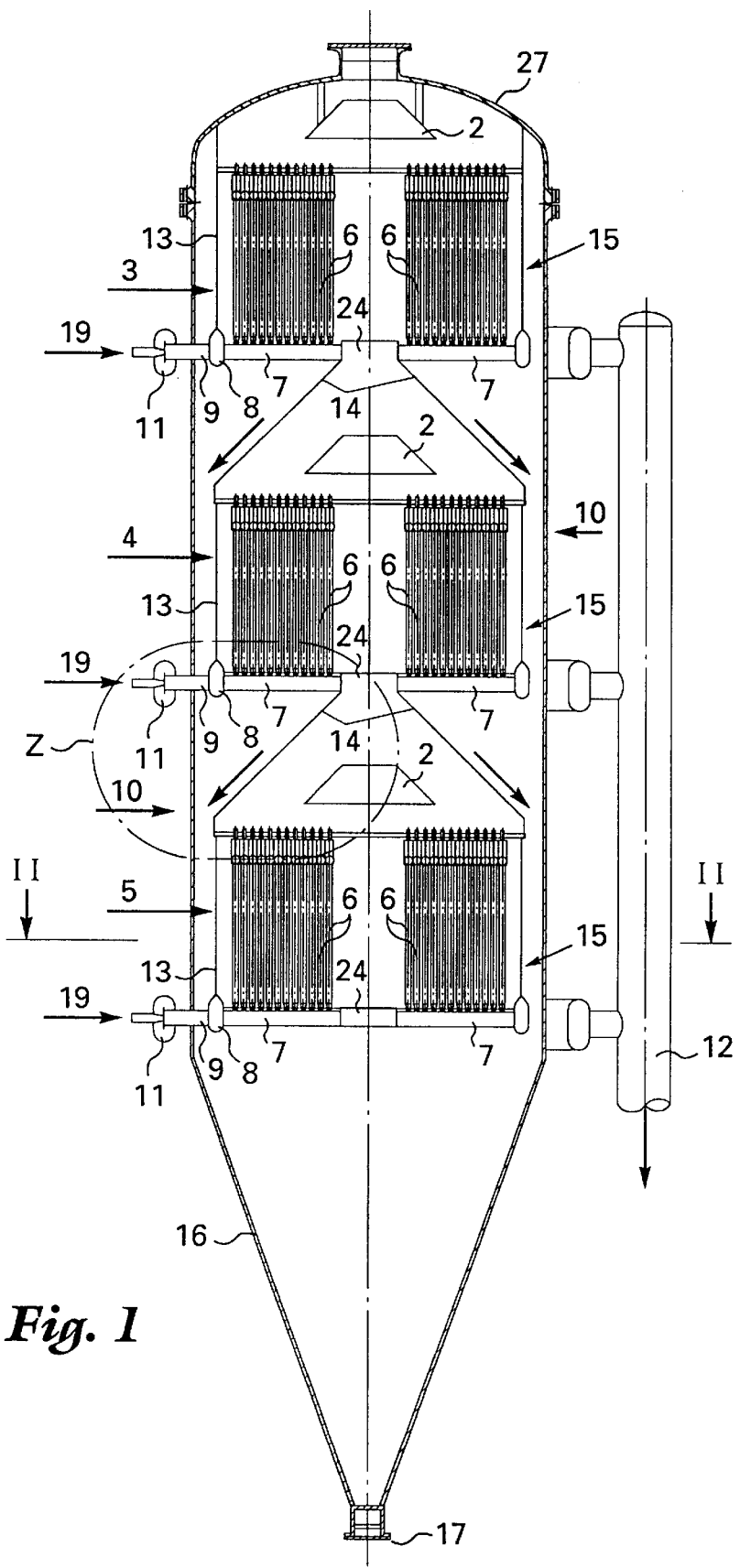
FIG. 1 the longitudinal section through an apparatus for the cleaning of gas, FIG. 2 the section II—II through FIG. 1, FIG. 3 the detail Z according to FIG. 1, FIG. 4 the section IV—IV through FIG. 3, FIG. 5 the longitudinal section through another apparatus for cleaning gas, FIGS. 6–8 respectively the section II—II through FIG. I according to a further embodiment, FIG. 9 the longitudinal section through another apparatus for cleaning gas, and FIG. 10 the longitudinal section through another apparatus for cleaning gas.

A cylindrical, pressurizable filter housing 10 closed by a cover 27 has in the cover 27 a centrally positioned inlet conduit 1 for the raw gas to be cleaned. The lower part of the filter housing 10 is shaped in the form of a funnel 16 which is provided with an exit conduit 17 for the removal of the detached dust. A distributor arrangement 2 with downwardly inclined deflector surfaces is positioned below the inlet conduit 1. The flow of raw gas which centrally enters through the inlet conduit is downwardly directed by the distributor arrangement 2 and transversely from the inside out to the filter candles 6.

The filter candles 6 are ceramic hollow bodies which are open at one end and which rest with their open end on straight supporting collectors 7. The supporting collectors 7 are parallel, spaced apart, and open into a clean gas collecting channel 8. The clean gas collecting channel 8 and the supporting collectors 7 are positioned in the same plane. The filter candles 6 can also be provided with a flange surrounding the open end and suspended thereby from the supporting collectors 7.

The clean gas collector channels 8 with the associated supporting collectors 7 and the filter candles 6 connected thereto form a filter module. Several of these filter modules are positioned one above the other in the filter housing 10. FIG. 1 shows three of these filter modules, namely an upper filter module 3, a central filter module 4 and a lower filter module 5 which respectively form one level of the whole filter unit.

Figure 2:
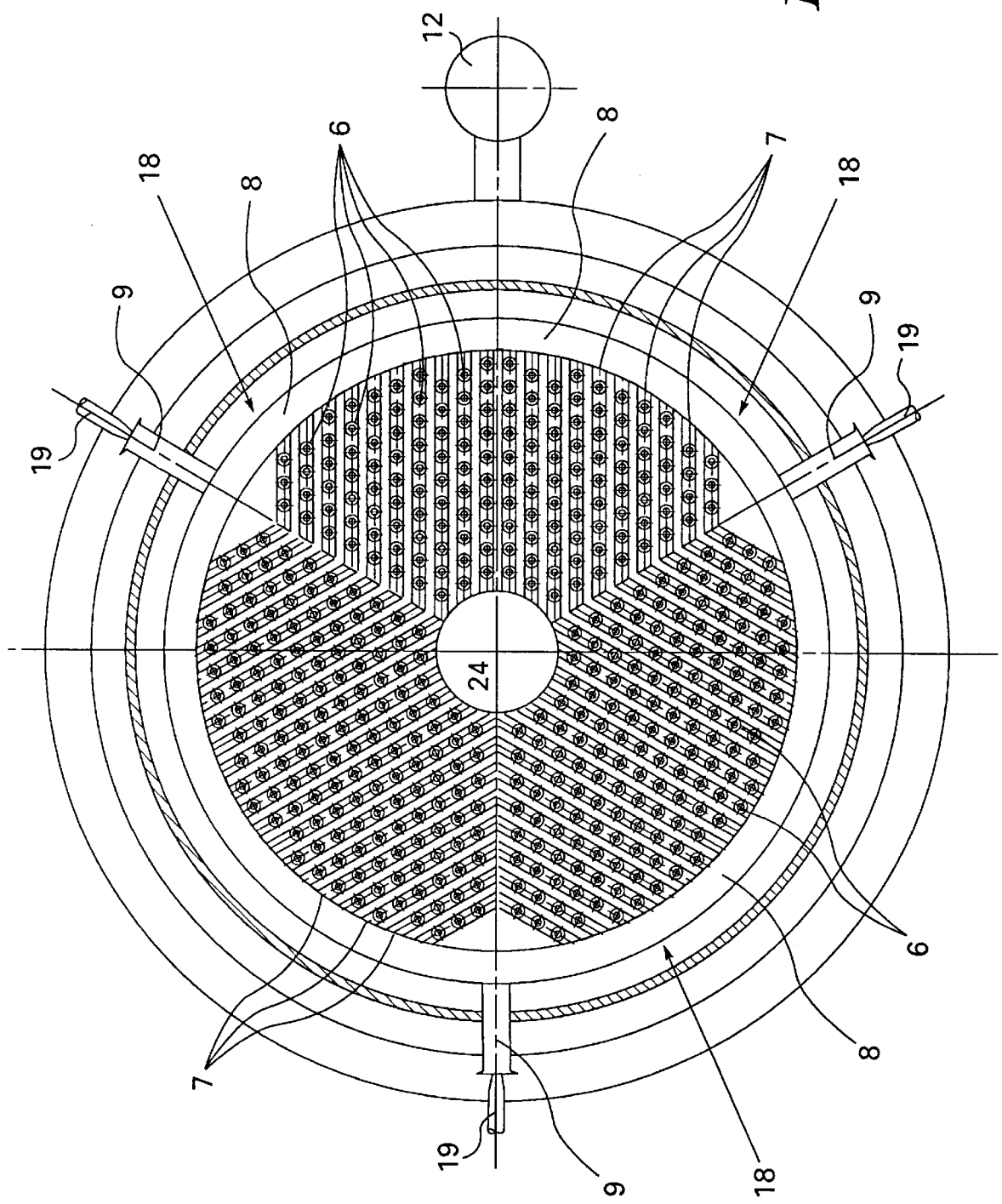

Each filter module 3, 4, 5 is divided into several filter segments 18 in the shape of a circular sector which on the gas side are separated from one another. A free space remains in the center of each filter module 3, 4, 5 which is kept free by the supporting collectors 7 and forms a central opening 24. Six or more of those filter segments 18 can be provided which are of the same size. According to FIG. 2, the filter module 5 is divided into three filter segments 18.

The collecting supports 7 of each filter segment 18 are connected with a separate clean gas collecting channel 8. The supporting collectors 7 are symmetrically positioned about an axis extending through the center of the filter segments 18. According to FIGS. 2 and 6, the clean gas collector channels 8 surround the supporting collectors 7 from the outside and are of annular shape. The supporting collectors 7 can thereby be positioned in the shape of a V with or parallel to the axis of symmetry. The annular clean gas collecting channels 8 are connected with a centrally positioned clean gas exhaust conduit 9 which is positioned in the axis of symmetry. This clean gas exhaust conduit 9 is guided through the wall of the filter housing 10 to the outside.

Figure 6:
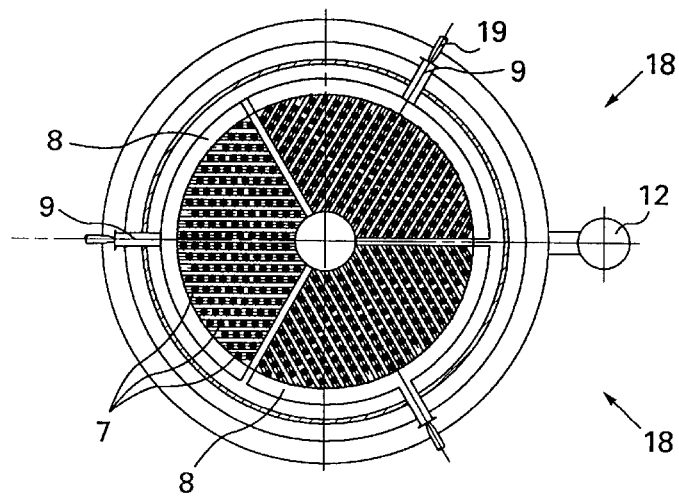
Figure 7:
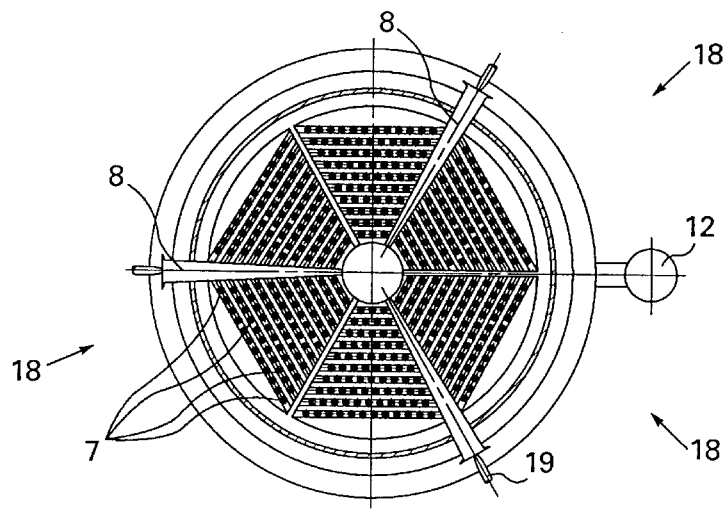

According to FIGS. 6 and 7, the clean gas collecting channels 8 are positioned along the axis of symmetry of the filter segment 18, whereby the supporting collectors 7 open from both sides into the clean gas collecting channel 8. Each of these clean gas collecting channels 8 is guided through the wall of the filter housing 10 to the outside. The cross-section of the clean gas collecting channels 8 increases in the direction of flow of the clean gas to the same extent as the flow volume increases. The increase in the flow-through cross-section can be achieved in the width or height direction of the respective clean gas collecting channel 8.

The clean gas exhaust conduits 9 (FIGS. 1, 2, 3, 6) which are guided to the outside, or the clean gas collecting channels 8 (FIGS. 7, 8) open into an annular clean gas collector 11 positioned at the same level outside the filter housing 10. The annular clean gas collectors 11 are connected to a common clean gas conduit 12.

A cleaning lance 19 respectively protrudes into that end of each clean gas exhaust conduit 9 or clean gas collecting channel 8 which protrudes outward through the wall of the filter housing 10, through which lance a pulsed gas is blown in for the cleaning of the filter candles 6. Each filter segment 18 is individually cleaned.

Figure 5:
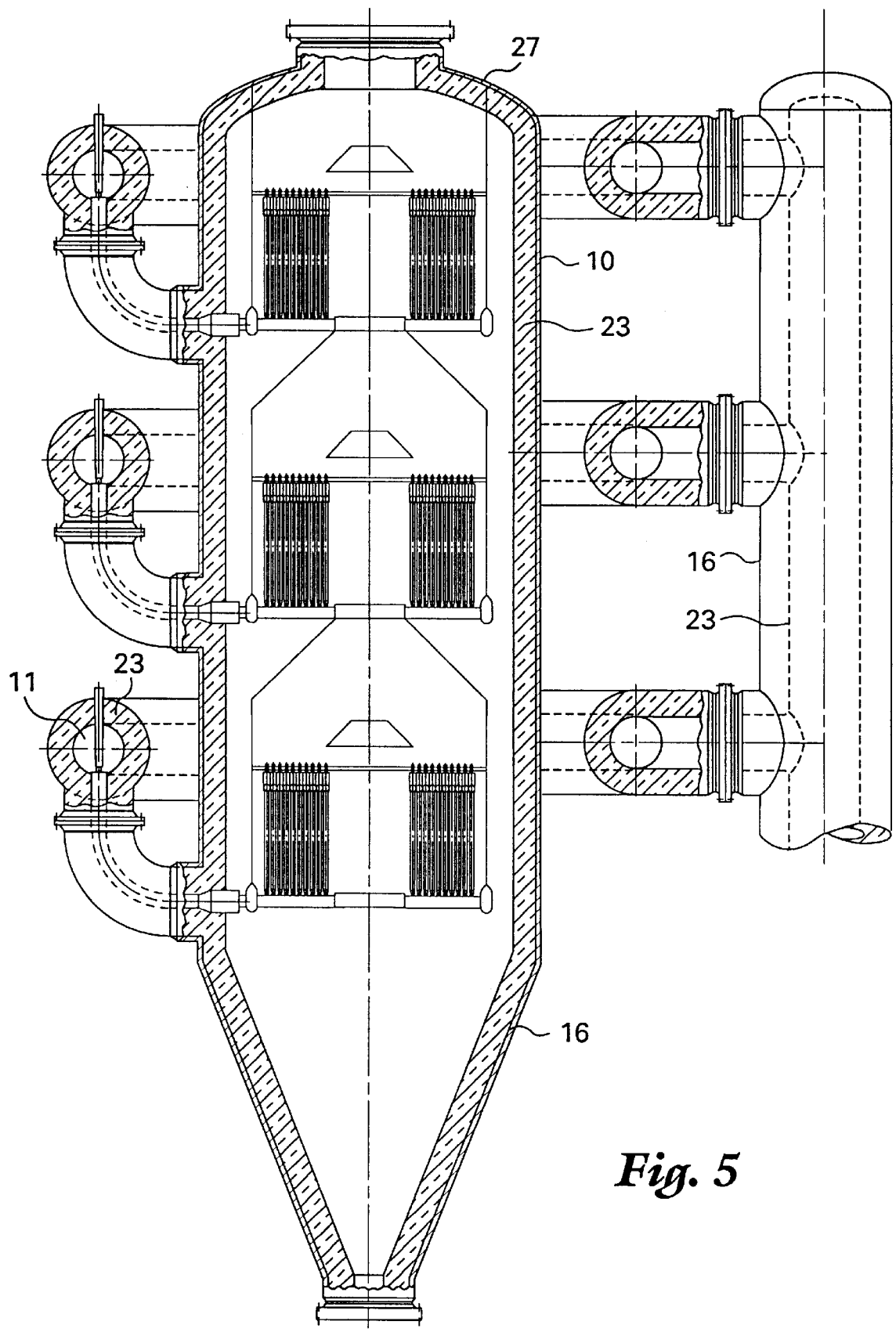

As shown in FIG. 5, the wall, the cover 27 and the funnel 16 of the filter housing 10 as well as the annular clean gas collectors 11 and the clean gas conduit 12 on their inside can be provided with a fire proof coating 23.

Each filter segment 18 of each filter module 3, 4, 5 is supported on the wall of the filter housing 10 by way of one or more support structures. The support structure is a wall console which according to FIG. 3 consists of one or more angled pipe elements 21. Especially when used as a hot gas filter, a cooling medium flows through the pipe elements 21. The support structure can also be provided with a double mantle for the cooling medium flowing therethrough.

Figure 10:
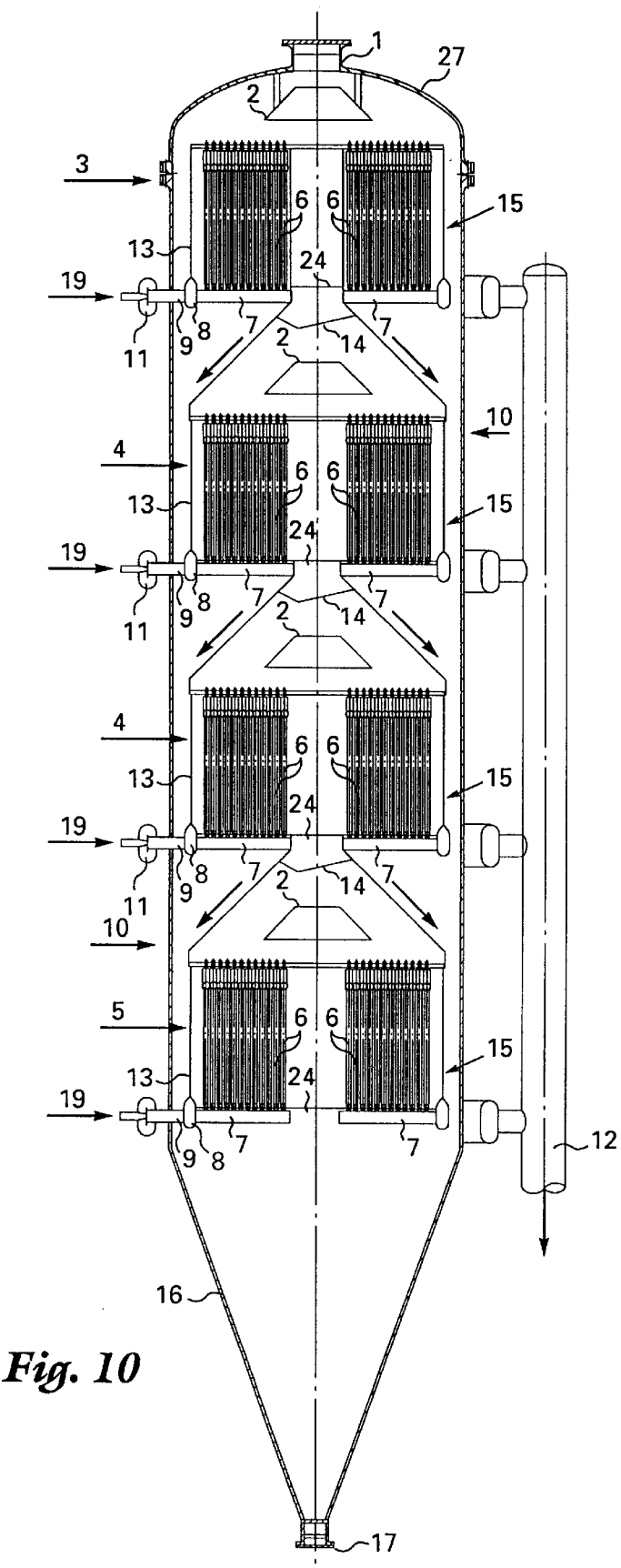

A support 22 is provided on the pipe elements 21 of the support structure which consists of a vertical web which carries two lateral webs. The supporting collectors 7 of two adjacent filter segments 18 slidingly rest on the webs of this support 22. The fixed point of a filter segment 18 is located at the point where the respective clean gas exhaust conduit 9 or clean gas collecting channel 8 penetrates the filter housing. The individual filter segment 18 can thereby slidingly expand upon an increase in temperature on the supports 22 towards the housing center without the need for a special compensator which can create problems at high temperatures or differential pressures. Thus, when the filter is operated with hot gases of up to 1000° C. the material expansion upon an increase in temperature affects only the individual filter element 18. In this arrangement of mechanically separate filter segments 18 only the weight of a single filter element 18 respectively rests on the support structure. The filter apparatus can therefore be provided with a large number of filter modules positioned one above the other. The filter housing can be made slim even when a large filter area is to be included. FIG. 10 shows a filter apparatus wherein four filter modules of the above principle construction are positioned one above the other.

Figure 8:
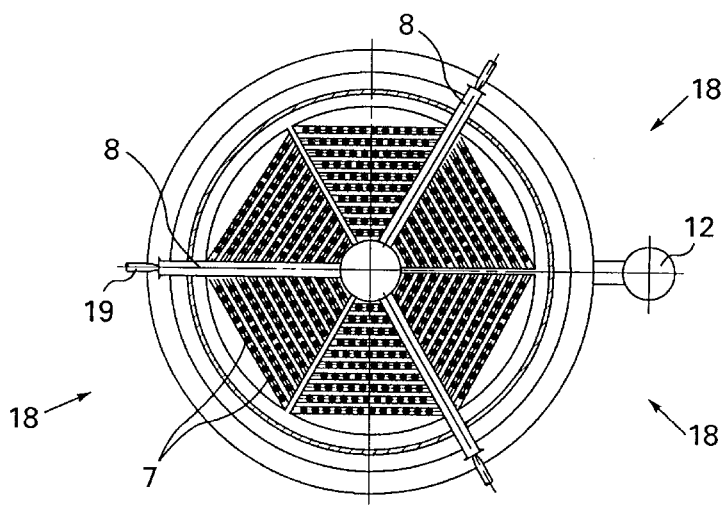

Each filter module 4, 5 is separated from the filter module 3, 4 thereabove by an ash removal mantle 15 made of sheet steel. The ash removal mantle 15 includes a cylindrical section 13 and a conical section 14 and bridges the interior of the filter housing 10 between two filter modules 3, 4, 5 located above one another. In the embodiment according to FIGS. 1 and 2 the cylindrical section 13 of the ash removal mantle 15 surrounds the filter candles 6 of the respective filter module 3, 4, 5 on the outside and extends at least to the upper edge of the filter candles 6. The lower edge of the ash removal mantle 15 is sealingly welded onto the clean gas collecting channel 8. If the supporting collectors 7 are positioned as shown in FIGS. 7 and 8, the cylindrical section 13 is connected to the outer supporting collectors 7. The conical section 14 tapers upwardly and merges with the opening 24 cleared from the supporting collectors 7 of the filter module 4, 3 thereabove. It is connected to the support structure formed by the pipe elements 21. The juncture 20 between the cylindrical section 13 and the conical section 14 is overlapped and slidably constructed as a sliding connection. The conical section 14 is omitted from the ash removal mantle 15 which surrounds the upper filter module 3. Instead, the cylindrical section 13 is connected at the upper edge with the cover 27 or the wall of the filter housing 10 and at that point or connection can be provided with a sliding connection.

The dust deposited on the filter candles 6 is periodically removed from the surface of the candles by way of pulsed gas which is injected through the cleaning lances 19 for a short period of time. The loosened dust is guided past the ash removal mantle 15 through the gap between the ash removal mantle 15 and the wall of the filter housing 10 and enters the funnel 16. The loosened dust thereby no longer comes into contact with the raw gas, since the latter flows along the interior of the ash removal mantle 15 to the filter candles 6 of the filter module 4, 5 respectively below. A mixing of already removed dust with the raw gas on its way to the filter candles 6 and a redepositing of the same dust is no longer possible. In this way a large amount of pulsed gas is saved which is required for the cleaning of the filter candles 6 and therefor must be clean, but always compressed to high pressures.

The annular gap for the dust removal between the wall of the filter housing 10 and the ash removal mantle 15 can be made small. The danger of bridging is reduced. The ash removal mantle 15 need only have a small wall thickness since the same pressure is present on both sides of the ash removal mantle 15.

Symmetrical flow characteristics of the raw gas stream are achieved, since the raw gas stream comes centrally from above and the clean gas is immediately removed at each level of the filter module 3, 4, 5. This leads to a relatively even loading of all filter candles 6 with dust and thereby to a further reduction in the pulse gas required for cleaning.

Figure 9:
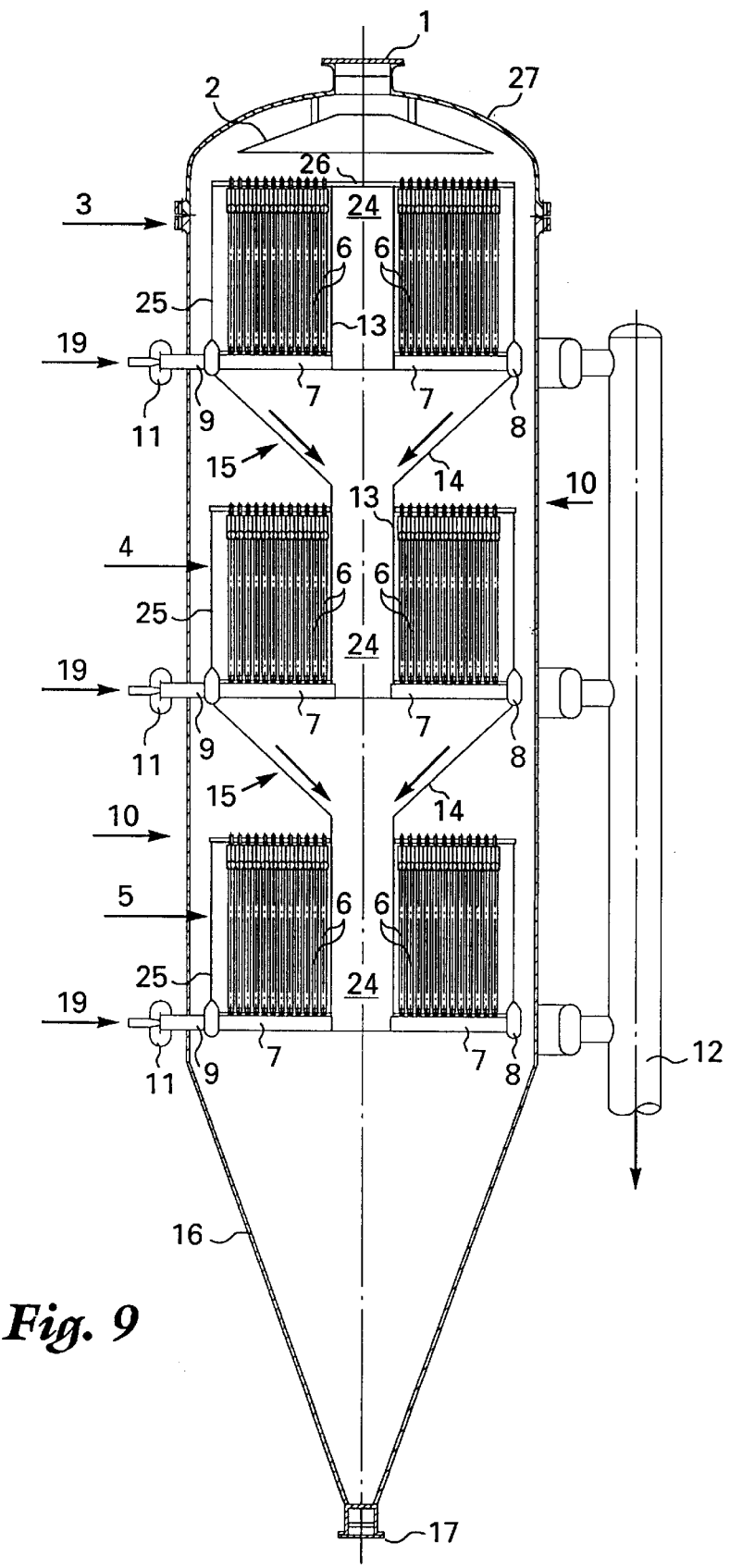

A variant of the ash removal mantle 15 is shown in FIG. 9. The cylindrical section 13 of the ash removal mantle 15 is therein positioned in the space spared from the supporting collectors 7 which forms the opening 24. The cylindrical section 13 inwardly borders the filter candles 6 of one filter module 3, 4, 5 and is connected with the supporting collectors 7. The conical section 14 which is directly adjacent the cylindrical section 13 opens upwardly and according to FIG. 9 is connected with the clean gas collecting channels 8 of the filter module 4, 5 positioned thereabove. The central, free space of the upper filter module 3 is closed by a plate 26. The filter candles 6 of each filter module 3, 4, 5 are outwardly surrounded by a guide mantle 25. The operation of this ash removal mantle 15 corresponds to the one of the aforedescribed ash removal mantle 15. The raw gas to be cleaned enters through the entry flange 1 and vertically impinges on the filter candles 6 of the upper filter module 3 from above. A further portion of the raw gas flows downward and between the ash removal mantle 15 and the wall of the filter housing 10 towards the filter modules 4, 5 below.

There the raw gas guided by the guide mantle 25 and the cylindrical section of the ash removal mantle 15 impinges vertically from above onto the filter candles of the respective filter module 4, 5. The dust loosened by the cleaning from the filter candles 6 is guided along the inside of the ash removal mantle 15 and past the filter candles 6 of the filter module 4, 5 below without coming into contact again with the raw gas.

The embodiments of the invention in which an exclusive property or privilege is claimed are defined as follows:

1. Apparatus for cleaning dust laden hot gas comprising: ceramic filter candles closed at one end and stacked one above another in several levels; a filter housing for holding said candles; supporting collectors spaced apart and connected to said candles, a plurality of candles being connected to one supporting collector; a plurality of supporting collectors communicating with a clean gas collecting channel lying in the same level a clean gas line connected to the clean gas collecting channels; a plurality of supporting collectors forming together with the associated clean gas collecting channel a filter segment of a circular-shaped sector; a plurality of filter segments separated from each other forming together a filter module within a level, each level having a center with a space free of supporting collectors; a cleaning lance projecting into each clean gas collecting channel.

2. Apparatus as defined in claim 1, wherein said supporting collectors of each filter segment are positioned symmetrically to a center line extending through a center of said filter module.

3. Apparatus as defined in claim 1, wherein said clean gas collecting channels are positioned symmetrically along a center line of said filter segment, said collecting supports communicating at both sides into said clean gas collecting channel.

4. Apparatus as defined in claim 1, wherein said clean gas collecting channel is annular shaped and surrounds said collecting supports of a filter segment on the outside.

5. Apparatus as defined in claim 1, wherein each filter segment is individually supported on a wall of said filter housing by support means; a support member on said support for supporting slidingly said filter segment; each clean gas collecting channel being held in said filter housing as a fixed point for the respective filter segment.

6. Apparatus for cleaning dust laden hot gas comprising: ceramic filter candles closed at one end and stacked one above another in several levels; a filter housing for holding said candles; supporting collectors spaced apart and connected to said candles, a plurality of candles being connected to one supporting collector; a plurality of supporting collectors communicating with a clean gas collecting channel lying in the same level, a clean gas line connected to the clean gas collecting channels; a plurality of supporting collectors forming together with the associated clean gas collecting channel a filter segment of a circular-shaped sector; a plurality of filter segments separated from each other forming together a filter module within a level, each level having a center with a space free of supporting collectors; a cleaning lance projecting into each clean gas collecting channel; said supporting collectors of each filter segment being positioned symmetrically to a center line extending through a center of said filter module; said clean gas collecting channels being positioned along a center line of said filter segment, said collecting supports communicating at both sides into said clean gas collecting channel.

7. Apparatus as defined in claim 1, wherein said supporting collectors of each segment are positioned symmetrically to a center line extending through a center of said filter module, said clean gas collecting channel being annular-shaped and surrounding said collecting supports of a filter segment on the outside.

8. Apparatus as defined in claim 6, wherein each filter segment is individually supported on a wall of said filter housing by support means; a support member on said support for supporting slidingly said filter segment; each clean gas collecting channel being held in said filter housing as a fixed point for the respective filter segment.

9. Apparatus as defined in claim 7, wherein each filter segment is individually supported on a wall of said filter housing by support means; a support member on said support for supporting slidingly said filter segment; each clean gas collecting channel being held in said filter housing as a fixed point for the respective filter segment.

10. Apparatus as defined in claim 3, wherein said clean gas collecting channels extend through said filter housing to the outside.

11. Apparatus as defined in claim 4, wherein said annular-shaped clean gas collecting channel has a central clean gas exhaust conduit and extends through a wall of said filter housing to the outside.

12. Apparatus as defined in claim 11, wherein the clean gas exhaust conduits have outwardly protruding ends opening into an annular clean gas collector positioned at the same level outside said filter housing and connected to a common clean gas conduit.

13. Apparatus as defined in claim 5, wherein said support means comprises pipe elements.

14. Apparatus as defined in claim 5, wherein said support means is cooled.

15. Apparatus as defined in claim 12, wherein said filter housing, said annular clean gas collectors and said clean gas conduit have on their inside a fire-proof coating.

16. Apparatus as defined in claim 3, wherein said clean gas collecting channels are configured so that flow through a cross-section of said clean gas collecting channels increases in the direction of flow.

17. Apparatus as defined in claim 11, wherein said cleaning lance protrudes into an end of each clean gas exhaust conduit, said clean gas exhaust conduit protruding outward through a wall of said filter housing.

18. Apparatus for cleaning dust laden hot gas comprising: ceramic filter candles closed at one end and stacked one above another in several levels; a filter housing for holding said candles; supporting collectors spaced apart and connected to said candles, a plurality of candles being connected to one supporting collector; a plurality of supporting collectors communicating with a clean gas collecting channel; lying in the same level a clean gas line connected to the clean gas collecting channels; a plurality of supporting collectors forming together with the associated clean gas collecting channel a filter segment of a circular-shaped sector; a plurality of filter segments separated from each other forming together a filter module within a level, each level having a center with a space free of supporting collectors; a cleaning lance projecting into each clean gas collecting channel; said supporting collectors of each filter segment being positioned symmetrically to a center line extending through a center of said filter module; said clean gas collecting channels being positioned along a center line of said filter segment, said collecting supports communicating at both sides into said clean gas collecting channel; said clean gas collecting channels being configured so that flow through a cross-section of said clean gas collecting channels increases in the direction of flow; clean gas collecting channels extending through said filter housing to the outside; said clean gas collecting channel being annular shaped and surrounding said collecting supports of a filter segment on the outside; said annular-shaped clean gas collecting channel having a central clean gas exhaust conduit extending through a wall of said filter housing to the outside; the clean gas exhaust conduits having outwardly protruding ends opening into an annular clean gas collector positioned at the same level outside said filter housing and connected to a common clean gas conduit; said cleaning lance protruding into an end of each clean gas exhaust conduit, said clean gas exhaust conduit protruding outward through a wall of said filter housing; each filter segment being individually supported on a wall of said filter housing by support means; a support member on said support for supporting slidingly said filter segment; each clean gas collecting channel being held in said filter housing as a fixed point for the respective filter segment; said support means comprising pipe elements and being cooled; said filter housing, said annular clean gas collectors and said clean gas conduit having on their inside a fire-proof coating.

\* \* \* \* \*